United States Patent Office 2,709,660
Patented May 31, 1955

2,709,660
TAP HOLE MIX

Howard L. Larson, Lakewood, and Lester L. Winter, Fairview Park, Ohio, assignors to Union Carbide and Carbon Corporation, a corporation of New York No Drawing. Application June 30, 1951,
Serial No. 234,658

2 Claims. (Cl. 106—56)

This invention relates to tap hole mixes to be used for closing ("plugging") the tap holes of blast furnaces and the like.

For the removal of molten metal from blast furnaces and the like a tap hole must be provided. This tap hole extends through the lining of the furnace into the hearth and communicates with a trough on the outside of the furnace for directing tapped, molten metal to a ladle or other receptacle. Between casts from the furnace the tap hole must of course be closed, and for closing it, it is conventional practice to extrude a mass of water wet clay from a "mud gun" into the hole. The heat of the furnace causes the clay to set up, forming a refractory plug in the tap hole. When the time comes to tap the furnace, this plug is partially drilled out, and conventionally is then subjected to the action of an oxygen lance to burn through into the furnace hearth or until the molten metal starts to flow from the furnace.

For many years carbon has been recommended as a lining material for blast furnaces, particularly in the hearth, and because of its excellent characteristics, its use for this purpose has become rather widespread. More recently, carbon has been used as a lining in the immediate vicinity of the tap hole as well as in other portions of the furnace, but here some difficulty has been encountered in that there is a loss of carbon in the vicinity of the tap hole during use of the furnace. This loss of carbon manifests itself by a gradual thinning of the lining and the formation of a funnel-shaped depression in the zone surrounding the tap hole. If unchecked, such carbon loss could lead to a "run-out", that is, accidental discharge of molten metal from the furnace.

It is the principal object of this invention to prevent this destruction of the carbon lining. More specifically, it is an object of the invention to provide a novel tap hole mix for plugging the tap holes of blast furnaces and the like.

The invention by means of which this object is attained is based on the discovery that the destruction of carbon in the vicinity of the tap hole is attributable at least in part to reactions between steam evolved from the wet clay used to plug the tap hole and the carbon. Such reactions are exemplified by the following equations:

(1) $C + 2H_2 = CO_2 + 2H_2$
(2) $CO_2 + C = 2CO$

In accordance with the present invention these reactions are substantially prevented from taking place with the carbon lining by utilizing a novel tap hole mix. The tap hole mix of the invention contains a small proportion of an organic liquid having a boiling point of from 56° C. to 200° C. and being soluble in water to the extent of at least 5 parts per 100 parts. Examples of such liquids are normal propyl alcohol, isopropyl alcohol, ethyl alcohol, methyl ethyl ketone, diethyl acetal, butyl amine, ethylene glycol and the monomethyl ether of ethylene glycol. A mixture of liquids may be employed if desired.

The organic liquid in the tap hole mix of the invention replaces a portion of the water ordinarily necessary to attain the desired degree of plasticity in the mix. Generally, the water content of a conventional clay tap hole mix is about 15% to 25% by weight depending upon the type of clay used and the desires of the operator. In the tap hole mix of the invention this may be reduced somewhat, being replaced by organic liquid. Generally about 1% to 5% by weight of the mix of organic liquid is present in the mix of the invention and the water content may be about 10% to 15%. The remainder of the mix is comminuted refractory material such as clay or clay and crushed fire brick. More than 5% of organic liquid may be used but affords little additional benefit and is undesirable from the standpoint of cost.

To determine the effectiveness of the tap hole mix of the invention, a series of tests was made in which a carbon tube composed of the type of carbon used to line a blast furnace was plugged with tap hole mixes of different formulations and subjected to temperatures up to 1400° C., the probable maximum temperature encountered at the tap hole in a blast furnace. The difference in weight of the tube before and after testing is a measure of the carbon lost. The following table sets forth a summary of typical test results obtained in one series of tests of a mix composed of clay, water and varying proportions of different organic liquids. The results are expressed in relation to the weight loss of a tube plugged with a clay-water mix.

| Percent Water | Percent Organic Liquid | Relative Oxidation of Tube |
|---|---|---|
| 18.3 | None | 1.00 |
| 14.0 | 1.9 ethyl alcohol | 0.27 |
| 14.0 | 3.8 ethyl alcohol | 0.19 |
| 10.0 | do | 0.13 |
| 10.0 | 3.8 isopropyl alcohol | 0.14 |
| 10.0 | 3.8 normal propyl alcohol | 0.06 |
| 10.0 | 3.8 ethylene glycol | 0.21 |
| 10.0 | 3.8 monomethyl ether of ethylene glycol | 0.17 |

The above data indicate the substantial reduction in oxidation loss of carbon adjacent to the tap hole mix of the invention. It is believed that there are two possible explanations for this. The organic liquid under the influence of intense heat vaporizes, and the vapors crack to such products as free carbon, methane, carbon monoxide and hydrogen, thus producing a reducing atmosphere which would protect the carbon. Further, the free carbon produced by the cracking is more readily attacked by the steam evolved from the mix than is the carbon of the lining. Whether or not either of these hypotheses is true, however, the fact is that oxidation of the carbon was greatly reduced when the tap hole mix of the invention was used.

It is often the practice to mix with the clay of conventional tap hole mixes ground coke or coal or the like to make the mix more porous. Such materials may be present in the mix of the invention, and are referred to in the appended claims as extenders. The strength of the mix when fired may be improved by the addition of ordinary molasses to the mix in an amount up to about 10% by weight.

The mix of the invention is prepared in the usual way. The comminuted solid constituents are moistened with organic liquid-water solution and the mix is then extruded into the tap hole of a furnace. Under the influence of the heat of the furnace it sets up in the usual way plugging the tap hole effectively.

What is claimed is:

1. A method of inhibiting oxidation caused in carbon lined blast furnaces by steam release from water wet refractory mixes used in plugging tap holes in such furnaces, which method comprises reducing the water content of said mix, incorporating therein in an amount of not more than 5 per cent by weight of the total amount of mix, an organic liquid selected from the group consisting of normal propyl alcohol, methyl ethyl ketone, butyl amine, ethylene glycol, and the monomethyl ether of ethylene glycol, and extruding said mix into the tap hole of said furnace.

2. A plastic extrudable mix for plugging the tap hole of carbon lined blast furnaces, said mix consisting of comminuted solid refractory filler material, moistened and rendered plastic by water and at least one organic liquid selected from the group consisting of normal propyl alcohol, methyl ethyl ketone, butyl amine, ethylene glycol, and the monomethyl ether of ethylene glycol, said mix containing by weight 10 per cent of water and 3.8 per cent of said organic liquid, said water having a tendency to cause oxidation of said carbon lining when said hole is plugged with said mix and said organic liquid inhibiting such oxidation.

References Cited in the file of this patent

UNITED STATES PATENTS

| | | |
|---|---|---|
| 607,928 | Hicks | July 26, 1898 |
| 1,458,726 | Ohman | June 12, 1923 |
| 1,891,979 | Hanauer | Dec. 27, 1932 |